(12) United States Patent
Vinton

(10) Patent No.: US 8,706,507 B2
(45) Date of Patent: Apr. 22, 2014

(54) ARBITRARY SHAPING OF TEMPORAL NOISE ENVELOPE WITHOUT SIDE-INFORMATION UTILIZING UNCHANGED QUANTIZATION

(75) Inventor: Mark Stuart Vinton, San Francisco, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 715 days.

(21) Appl. No.: 12/310,124

(22) PCT Filed: Aug. 10, 2007

(86) PCT No.: PCT/US2007/017811
§ 371 (c)(1),
(2), (4) Date: Sep. 28, 2009

(87) PCT Pub. No.: WO2008/021247
PCT Pub. Date: Feb. 21, 2008

(65) Prior Publication Data
US 2010/0094637 A1 Apr. 15, 2010

Related U.S. Application Data

(60) Provisional application No. 60/838,094, filed on Aug. 15, 2006.

(51) Int. Cl.
*G10L 19/00* (2013.01)
*G10L 19/008* (2013.01)
*H04B 1/66* (2006.01)

(52) U.S. Cl.
CPC ............. *G10L 19/008* (2013.01); *H04B 1/665* (2013.01)
USPC ........................................ 704/500; 704/200.1

(58) Field of Classification Search
CPC ............................. G10L 19/008; H04B 1/665
USPC ................................................ 704/500, 200.1
See application file for complete search history.

(56) References Cited

U.S. PATENT DOCUMENTS 5,206,884 A * 4/1993 Bhaskar ........................ 375/254
(Continued)

FOREIGN PATENT DOCUMENTS

| JP | H03-201716 | 9/1991 |
|----|----|----|
| TW | 200423028 | 11/2004 |
| TW | I226602 | 1/2005 |
| TW | 324762 | 2/2005 |
| WO | 2006107833 | 10/2006 |
| WO | WO 2008/021247 A2 | 2/2008 |

OTHER PUBLICATIONS

International Search Report, International Application Published Under the Patent Cooperation Treaty (PCT), WO 2008/021247 A3, PCT/US2007/017811, Feb. 19, 2008.

(Continued)

*Primary Examiner* — Farzad Kazeminezhad

(57) ABSTRACT

In a first aspect, arbitrary shaping of the temporal envelope of noise is provided in spectral domain coding systems without the need of side-information. In the encoding, a filtered measure of quantization error is applied as a feedback signal to the frequency-domain representation of a discrete time-domain signal prior to quantization, so that the filtering parameters of said filtering affect the shaping of quantization noise in the time domain of the quantized frequency-domain representation with unchanged quantization of the discrete time-domain signal when it is inversely transformed from the frequency domain back to the time domain in decoding. This may be accomplished with respect to each of a plurality of frequency bins or groups of bins. In another aspect, frequency-domain noise-feedback quantizing in digital audio encoding is provided.

22 Claims, 3 Drawing Sheets

(56) References Cited

U.S. PATENT DOCUMENTS

| | | | |
|---|---|---|---|
| 5,487,086 A | 1/1996 | Bhaskar | |
| 5,623,577 A * | 4/1997 | Fielder | 704/200.1 |
| 6,363,338 B1 * | 3/2002 | Ubale et al. | 704/200.1 |
| 7,171,355 B1 * | 1/2007 | Chen | 704/226 |
| 7,453,942 B2 * | 11/2008 | Gigi | 375/245 |
| 7,512,535 B2 * | 3/2009 | Chen et al. | 704/228 |
| 2006/0074693 A1 * | 4/2006 | Yamashita | 704/500 |

OTHER PUBLICATIONS

Written Opinion of the International Searching Authority, International Application Published Under the Patent Cooperation Treaty (PCT), WO 2008/021247 A3, PCT/US2007/017811, Feb. 19, 2008.

Herre, Jurgen, "Temporal Noise Shaping, Quantization and Coding Methods in Perceptual Audio Coding: A Tutorial Introduction," AES 17th International Conference on High Quality Audio Coding, Sep. 2, 1999.

* cited by examiner

ARBITRARY SHAPING OF TEMPORAL NOISE ENVELOPE WITHOUT SIDE-INFORMATION UTILIZING UNCHANGED QUANTIZATION

TECHNICAL FIELD

The invention relates to digital audio coding. In particular, aspects of the invention relate to a digital audio encoding method; a digital audio decoder adapted to decode a bitstream generated by said digital audio encoding method; a digital audio decoding method; a method for frequency-domain noise-feedback quantizing in a digital audio encoder, apparatus for performing any of such methods; a computer program, stored on a computer-readable medium, for causing a computer to control such apparatus or to perform such methods; and a frequency-domain noise-feedback quantizer for use in a digital audio encoder.

BACKGROUND ART

The trade-off between time and frequency in spectral domain audio coding systems has lead to several techniques to ensure high audio coding performance while minimizing audible coding errors. Such techniques include block switching and Temporal Noise Shaping (TNS) (see reference 1, below), both of which are employed in MPEG-2/4 AAC ("AAC") (see reference 2, below). Temporal Noise Shaping ("TNS") provides a way to use relatively long transform block lengths while ensuring that the temporal envelope of the noise is controlled to minimize audible artifacts.

A simplified block diagram of a prior art spectral-domain coding system (encoder and decoder) using TNS is shown in FIG. 1. In the encoder portion, a "Time to Frequency Transform" device or function 2 converts an incoming time-domain audio signal represented by a discrete time sequence x[n] which has been sampled from an audio source at some sampling frequency $f_s$ into the spectral domain (or "frequency" domain); in the case of AAC, a 2048 sample Modified Discrete Cosine Transform (MDCT) (see reference 3, below) is used. Prior to quantization in a quantizer or quantizing function ("Q") 4, the encoder applies a filter or filtering function 6 ("A(z)"), whose transfer function may be represented in the Z-domain as A(z), to the spectral domain signal. The encoder sends filter parameters to the decoder as side information. The decoder portion of the coder decodes the bitstream and applies to the spectrum the inverse filter or filtering function 8 ("1/A(z)"), whose transfer function in the Z-domain may be represented as 1/A(z). A "Frequency to Time Transform" 10 device or function (a transform inverse to the Time to Frequency Transform 2) converts the spectral domain signal to a discrete time-domain signal y(n). For simplicity, FIG. 1 ignores the perceptual allocation of the quantization noise and other well-known AAC and TNS details.

The overall spectral domain output of the quantizer 4 using TNS may be expressed in the Z-transform domain in the manner of equation 1. This analysis, and other analyses below, is based on a simple additive model of quantization.

$$Y(z) = \frac{A(z)X(z)}{A(z)} + \frac{E(z)}{A(z)} \quad (1)$$

where E(z) is the quantization error and A(z) is transfer function of the TNS filter.

Equation 1 can be simplified to equation 2.

$$Y(z) = X(z) + \frac{E(z)}{A(z)} \quad (2)$$

Equation 2 shows that the convolution process (multiplication by 1/A(z)) in the Z-domain is applied to the noise added during quantization of the audio spectrum. Because convolution in the spectral domain is equivalent to multiplication in the time domain, the effect of convolving the noise by 1/A(z) implies that the temporal shape of the noise has been multiplied by the temporal response of the inverse TNS filter. Hence, by selecting the filter A(z) appropriately, the quantization noise can be controlled to minimize audible artifacts generated by the low temporal resolution. TNS has been shown to significantly improve the performance of AAC, and thus is a very important tool in AAC.

However, TNS has some limitations. Namely, the encoder must transmit filter parameters to the decoder and the decoder must convolve the decoded spectrum by the inverse filter. These requirements lead to the following limitations:

1. Increased bit rate consumption in order to transmit the filter coefficients
2. The need to apply the inverse filter to the spectrum means that TNS cannot provide backward compatibility to existing systems such as AC-3 (see reference 4, below).
3. Increased decoder complexity due to the need to apply the inverse filter to the spectrum In accordance with aspects of the present invention, a new technique, based on noise feedback quantization (NFQ), allows the temporal envelope of the quantization noise in a spectral domain coding system to be modified while overcoming the limitation imposed by the TNS coding tool used in MPEG-2/4 AAC. According to aspects of the present invention, NFQ is employed instead of TNS in an AAC system. According to aspects of the present invention, NFQ may also be employed in other spectral domain coding systems such as an AC-3 system.

DISCLOSURE OF THE INVENTION

Figure 1:
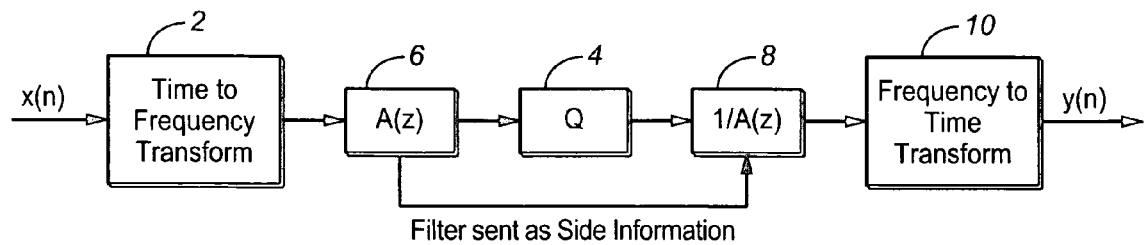
FIG. 1 is a simplified block diagram of a prior art spectral-domain coding system (encoder and decoder) using Temporal Noise Shaping (TNS).

In accordance with one aspect of the present invention, a digital audio encoding method for encoding a discrete time-domain signal is provided, the method employing quantization of a frequency-domain representation of the discrete time-domain signal. The method derives a measure of quantization error, filters the measure of quantization error to produce a filtered measure of quantization error, and applies the filtered measure of quantization error as a feedback signal to the frequency-domain representation of the discrete time-domain signal prior to quantization, whereby the filtering parameters of said filtering affect the shaping of quantization noise in the time domain of the quantized frequency-domain representation of the discrete time-domain signal when it is inversely transformed from the frequency domain back to the time domain.

The digital audio encoding method may filter the measure of quantization error to produce a filtered measure of quantization error for each of one or more frequency bins or groups of frequency bins so that the filtered measure of quantization error may vary throughout segments of the spectrum of the frequency-domain representation of the discrete time-domain signal. The filter parameters may be dynamically controllable. Such controllability may be in response to a measure of the discrete time-domain signal or to a measure of a frequency-domain representation of the discrete time-domain signal. The filter parameters may also be responsive to a temporal masking model (not shown in the drawings). The quantized frequency-domain representation of the discrete time-domain signal may then be encoded to produce an encoded bitstream.

In accordance with another aspect of the invention, a digital audio decoder adapted to decode a bitstream produced by the just-described encoding method is provided.

In accordance with a further aspect of the invention, a digital audio decoding method is provided for decoding an entropy encoded bitstream produced by an encoder that quantized the frequency-domain representation of a discrete time-domain signal, derived a measure of quantization error, filtered the measure of quantization error to produce a filtered measure of quantization error, applied the filtered measure of quantization error as a feedback signal to the frequency-domain representation of the discrete time-domain signal prior to quantization, and encoded the quantized frequency-domain representation of a discrete time-domain signal into a bitstream. The decoding method decodes the bitstream to produce the quantized frequency-domain representation of a discrete time-domain signal or an approximation thereof, de-quantizes the quantized frequency-domain representation or approximation thereof, and inversely transforms the frequency-domain representation or approximation thereof to the time domain to produce an audio signal, whereby the filtering parameters in the encoder affect the shaping of quantization noise of said audio signal.

In accordance with yet another aspect of the invention, a method for frequency-domain noise-feedback quantizing in a digital audio encoder is provided. The method combines a frequency domain signal derived from a time-domain audio signal with a noise feedback signal to generate a quantizer input signal, quantizes the quantizer input signal to generate a quantizer output signal, combines the quantizer input signal and the quantizer output signal to generate a quantization error signal, and filters the quantization error signal to generate the noise feedback signal.

In accordance with an aspect of the invention, apparatus adapted to perform the method for frequency-domain noise-feedback quantizing in a digital audio encoder is provided.

In accordance with another aspect of the invention, a computer program, stored on a computer-readable medium, for causing a computer to control the above-mentioned apparatus or method is provided.

In accordance with yet another aspect of the invention, a frequency-domain noise-feedback quantizer for use in a digital audio encoder is provided. The frequency-domain noise-feedback quantizer includes a first combiner that combines a frequency domain signal derived from a time-domain audio signal with a noise feedback signal to generate a quantizer input signal, a quantizer that quantizes the quantizer input signal to generate a quantizer output signal, a second combiner that combines the quantizer input signal and the quantizer output signal to generate a quantization error signal, and a noise feedback filter that filters the quantization error signal to generate the noise feedback signal.

Temporal shaping of the quantization noise in spectral audio coding systems is important for efficient audio compression. The TNS coding tool in MPEG-2/4 AAC provides temporal shaping of quantization noise; however, it is limited due to its need to transmit filter coefficients to the decoder. In accordance with aspects of the present invention, a spectral quantization process or device includes a feedback circuit or process that allows the temporal shape of the quantization noise to be controlled so as to have a wide range of arbitrary shapes. Furthermore, in an encoder/decoder coding system, there is no requirement to transmit filter coefficients to the decoder. The invention may provide one or more of the following benefits over the MPEG-2/4 AAC TNS coding tool and may be used instead of TNS:

1. Noise shaping performance comparable to TNS
2. Encoder-only process
3. No side-information transmission required
4. Backward compatibility with existing audio coding systems
5. Reduced decoder complexity Another benefit of the present invention is that the feedback filter may be changed throughout the spectrum such that the temporal progression of noise may be better matched to the signal characteristics of a spectral group. In other words, a unique feedback filter may be employed for each of one or more frequency bins or groups of frequency bins, a frequency bin constituting a spectral group. Although TNS can also provide such ability, the need to transmit filter coefficients to the decoder as well as the need to indicate the desired spectral group to the decoder significantly limits the number of spectral regions that can be used.

BEST MODE FOR CARRYING OUT THE INVENTION

Spectral Domain Noise Feedback Quantization (NFQ)

Figure 2:
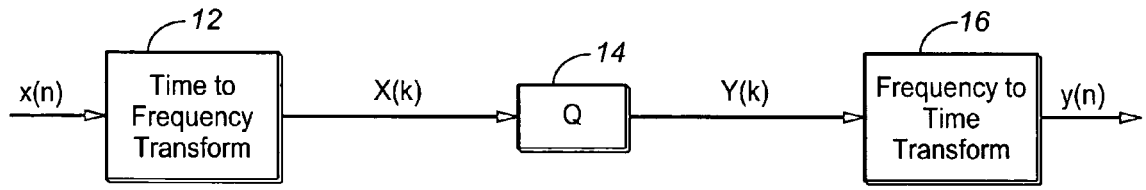
FIG. 2 is a schematic block diagram showing a simplification of a prior art modern audio coding system in which the input is converted to the spectral domain and the spectral representation of the signal is then quantized.

Most modern audio coding techniques, including AAC (see reference 2, below) and AC-3 (see reference 4, below), perform quantization in the spectral domain in order to control, in a perceptually relevant way, the noise introduced by quantization. Typically, the input time waveform is converted to the spectral domain using a time-frequency transform such as the MDCT. In parallel to the time-frequency transformation a perceptual model is calculated, which is then used to control the quantization noise occurring in each of the output coefficients of the time-frequency transform. FIG. 2 is a schematic block diagram showing a simplification of a prior art modern audio coding system (encoder and decoder) in which the input is converted to the spectral domain and the spectral representation of the signal is then quantized. A discrete time-domain signal x(n) is applied to a time-to-frequency transform or transform function ("Time to Frequency Transform") 12 that produces a frequency-domain (or spectral-domain) signal X(k). The spectral-domain signal is quantized by a quantizer or quantizing function ("Q") 14 to produce a quantized version Y(k) of the spectral-domain signal. The decoder portion of the system includes an inverse transform or transform function ("Frequency to Time Transform") 16 that provides a time-domain output signal.

Typically, the transforms used in modern audio coding systems are of lengths of 512 samples or greater to ensure good coding efficiency; for example, MPEG-2/4 AAC employs a 2048 point MDCT for pseudo-stationary signals. Although the transform provides good coding efficiency, the long length of the transform leads to time spreading of quantization noise (the quantization noise spreads throughout the transform block) and audible deterioration for non-stationary signals. Techniques such as block switching, TNS, and gain control, have been designed to combat this problem.

Figure 3:
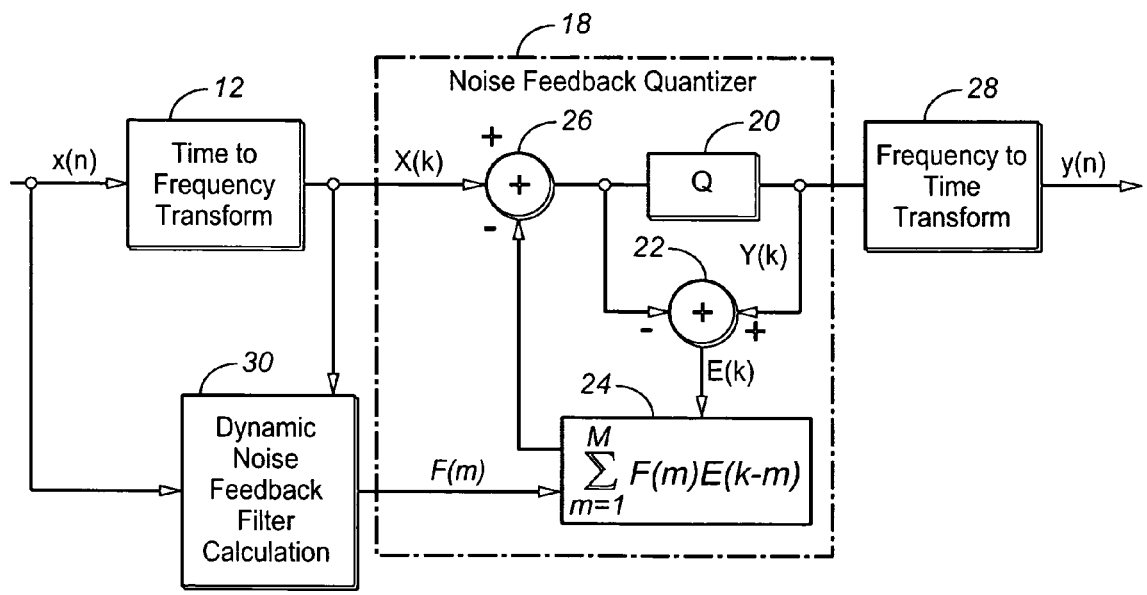
FIG. 3 is a functional schematic block diagram of an example of a simplified audio coding system embodying Noise Feedback Quantization (NFQ) in accordance with aspects of the present invention.

In accordance with aspects of the present invention, noise feedback quantization (NFQ) in the spectral domain is employed to control the temporal envelope of the quantization noise introduced during the quantization process in the spectral domain. FIG. 3 is a functional schematic block diagram of an example of a simplified audio coding system embodying NFQ in accordance with aspects of the present invention. The output (X(k)) of a time-frequency transform process or device ("Time to Frequency Transform") 12 is quantized by an NFQ quantizer or quantization function 18 that includes a feedback process or circuit that applies a filtered quantization error to the original transformed signal. The output (Y(k)) of the quantizer or quantization function ("Q") 20 in such a device or process may be expressed as in equation 3.

$$Y(k) = X(k) + E(k) - \sum_{m=1}^{M} F(m)E(k-m) \quad (3)$$

where E(k) is the quantization error, F(m) is coefficient in the feedback filter, X(k) is the frequency domain output of Time to Frequency Transform 12, k is the spectral bin index, and m is the filter tap index.

Alternatively, equation 3 can be re-written using a Z-transform representation to give equation 4:

$$Y(z) = X(z) + (1 - z^{-1}F(z))E(z) \quad (4)$$

Because convolution in the spectral domain is equivalent to multiplication in the time domain, the convolution of E(z) by $(1-z^{-1}F(z))$, as shown in equation 4, has the effect of multiplying the time error signal by the corresponding temporal effect of the NFQ feedback and quantizer arrangement, $(1-z^{-1}F(z))$. This implies that with the appropriate selection of F(z), the temporal envelope of the quantization error can be modified arbitrarily. Thus, although two ways to generate useful filter transfer functions are described below, it should be understood that the invention contemplates any other way to derive filter transfer functions that are deemed by a coding system designer to be useful in modifying the temporal envelope of quantization error.

It is shown in reference 5 that F(z) must take the form shown in equation 5. Furthermore, reference 5 provides a technique to solve optimally for F(z) with the constraints given in equation 5 as shown in equation 6.

$$F(z) = \sum_{m=0}^{M} a_m z^{-m} \quad (5)$$

Given $a_0 = 1$, $$\bar{F} = R^{-1}\bar{r} \quad (6)$$

where $$R = \begin{bmatrix} r(0) & r(1) & \ldots & r(M-1) \\ r(-1) & r(0) & \ldots & r(M-2) \\ \vdots & \vdots & \ddots & \vdots \\ r(-M+1) & r(-M+2) & \ldots & r(0) \end{bmatrix},$$

$\bar{r} = [r(1) \; r(2) \; \ldots \; r(M)]^T$, and r(m) is the autocorrelation sequence of the desired temporal noise weighting that can be generated in many ways. One way is to compute the envelope of the temporal signal, invert it and compute the inverse DFT (discrete Fourier transform) of the result as shown in equation 7. This method ensures that the resulting noise characteristics due to spectral domain quantization with feedback leads to approximately equal segmental signal-to-noise ratio (the signal-to-noise ratio computed over a small number of samples) at all samples within a transform block. This is demonstrated below.

$$E'(n) = \frac{1}{E(n)} \quad (7)$$

$$r(m) = \frac{1}{N} \sum_{n=0}^{N-1} E'(n) e^{\frac{j2\pi nm}{N}}$$

where E(n) is the envelope of the temporal signal and has only positive values, and N is the length of the transform block.

Alternatively, another way to obtain a desirable solution for F(z) is to employ the inverse of a TNS filter. For example, the filter coefficients may be generated from the impulse response of the LPC (linear-predictive-coding) coefficients derived from the autocorrelation of the input audio spectrum X(k).

The application and calculation of the noise feedback filter need not be static. Preferably, F(z) varies with time and is updated periodically, for example as often as every transform block, to provide the appropriate temporal shaping of the quantization noise. Also, as mentioned above, a unique F(z) may be employed for each of one or more frequency bins or groups of frequency bins. Thus, F(z) may have different coefficients from bin to bin (frequency-wise) and from transform block (time-wise).

Returning to the description of FIG. 3, the NFQ device or process 18 subtractively combines in a combiner 22 the input to the quantizer or quantization function 20 with its output Y(k) to produce a quantization error signal E(k). The error signal is, in turn, filtered by a filter or filtering function 24 for subtractive combining in combiner 26 with the frequency domain output of Time to Frequency Transform 12, X(k). The output Y(k) of the NFQ device or process 18 is applied to a Frequency to Time Transform device or process 28, which provides an inverse transformation to the transformation of Time to Frequency Transform 12. Preferably, the filter or filtering function 24 is dynamic and its filter coefficients are controlled by a measure of either (1) the time-domain input signal x(n) or (2) the frequency-domain version of the input signal X(k) as determined by a Dynamic Noise Feedback Filter Calculation device or function 30.

Although the specific reshaping of the temporal noise may be selected by the designer of a particular coding arrangement from a wide range of arbitrary shapes, in general, it is desired to shift the noise from quiet segments of the audio to louder segments of the audio.

Performance of the Spectral NFQ

Figure 4:
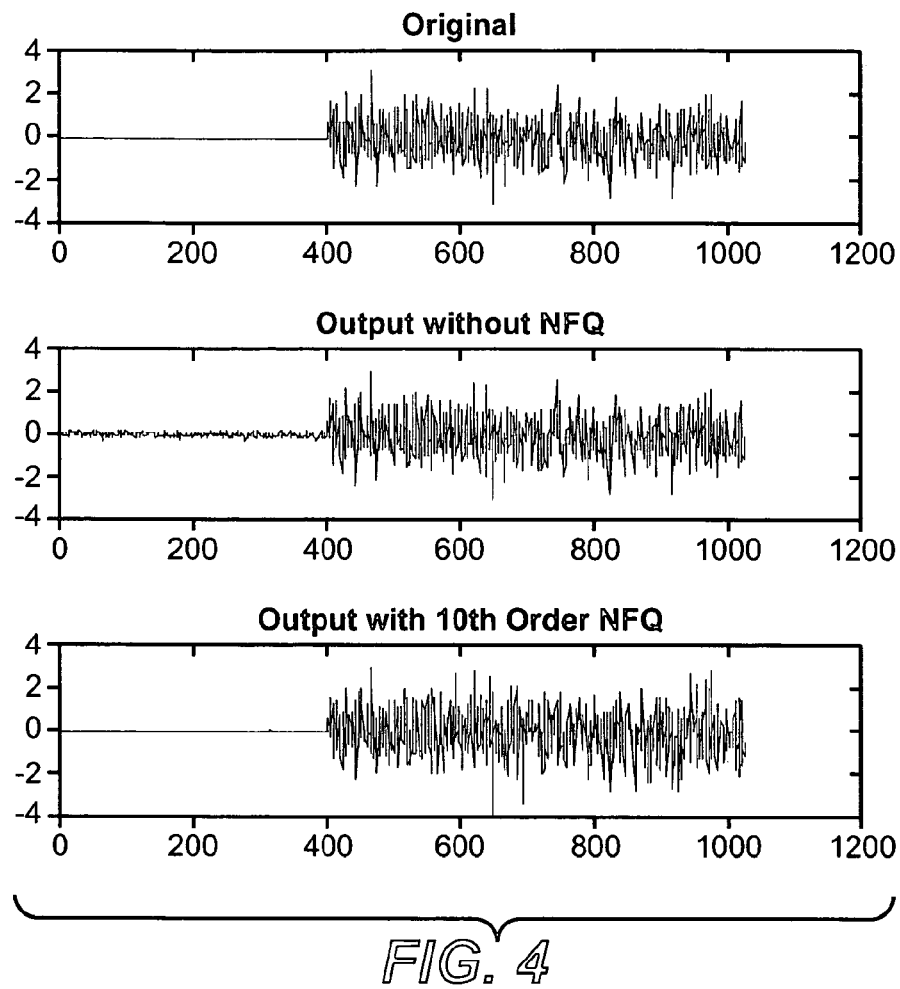
FIG. 4 is an example of the results of an application of an embodiment of the present invention in which the noise feedback filter is designed for the audio contents of a particular transform block such that the segmental signal-to-noise ratio is approximately constant.

An example of the performance of an application of an embodiment of the present invention is given in FIG. 4 in which the noise feedback filter or filter function is designed for the audio contents of a particular transform block such that the resulting segmental signal to noise ratio may be approximately constant. Segmental signal-to-noise ratio is defined as the SNR computed over a small number of samples—in this example fewer than the number of samples in a transform block. Furthermore, in this example, the order of the noise feedback filter is set to 10. The top plot in FIG. 4 shows an input time-domain waveform within a transform block that has a sharp transient. The middle plot shows the output of a simple spectral domain coder in which the quantization noise spreads throughout the transform block prior to the transient onset. The lower plot shows the output of the spectral domain audio coder with the application of an embodiment of the present invention employing a $10^{th}$ order NFQ. For the NFQ process or system in this example, the feedback filter is calculated such that segmental SNR remains approximately constant throughout the transform block. The output of the NFQ process or system has significantly less pre-echo (that portion of the noise spread within a transform block that precedes a transient) than an arrangement without NFQ, demonstrating the ability of aspects of the invention to modify the temporal envelope of the quantization noise.

Figure 5:
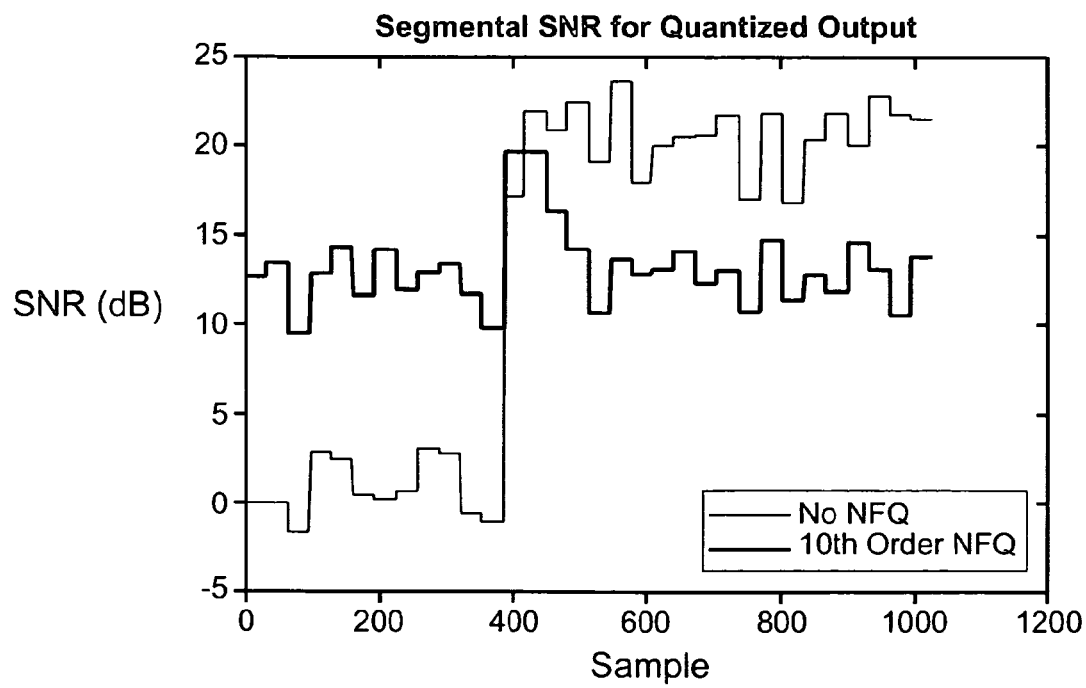
FIG. 5 shows the segmental SNR for both a simple spectral domain coder without NFQ (dashed) and an exemplary $10^{th}$ order NFQ system (solid) with an input signal as shown in FIG. 4.

FIG. 5 shows the segmental SNR for both a simple spectral domain coder without NFQ (dashed) and such a coder employing a $10^{th}$ order NFQ arrangement (solid), the encoder receiving an input signal as shown in FIG. 4. The segmental SNR remains approximately constant throughout the transform block for the process or system with NFQ, while the process or system without NFQ has very low segmental SNR prior to the onset of the transient.

Although constant segmental SNR demonstrates some advantages of an embodiment of the invention employing NFQ, it may not reflect an example that employs an optimal allocation of noise. In practice, the designer of the process or device may choose what he or she deems to be appropriate temporal noise allocation depending on the temporal characteristics of the signal. As suggested below, aspects of the invention may, if desired, use complex temporal masking models to derive a desired temporal noise envelope of the quantization noise.

Application of Noise Feedback Quantization in Perceptual Audio Coding Systems

Figure 6:
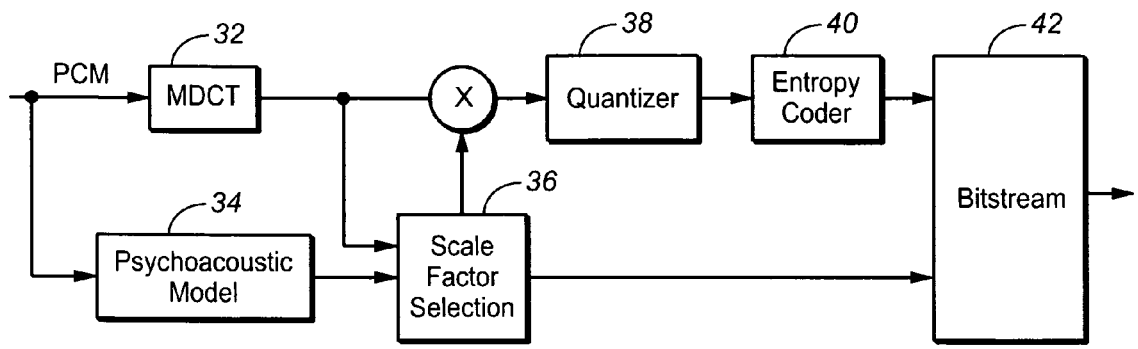
FIG. 6 is a simplified schematic block diagram of a prior art MPEG-2/4 AAC encoder.

A simplified schematic block diagram of a prior art MPEG-2/4 AAC encoder is shown in FIG. 6. The input pulse code modulation (PCM) audio is converted to the spectral domain using a 2048 point MDCT 32 and an estimate of the masking curve for that block is computed using a psychoacoustic model 34. Scale factors are then selected (36) such that noise (due to quantization of the spectrum) to mask ratio (NMR) remains as low as possible. The resulting signal is quantized (38) and then entropy coded (40). A formatter or formatting process ("Bitstream") 42 produces an encoded bitstream output. This technique, however, ignores temporal masking within individual transform blocks. In accordance with aspects of the present invention, there is now a way to allocate quantization noise temporally.

Figure 7:
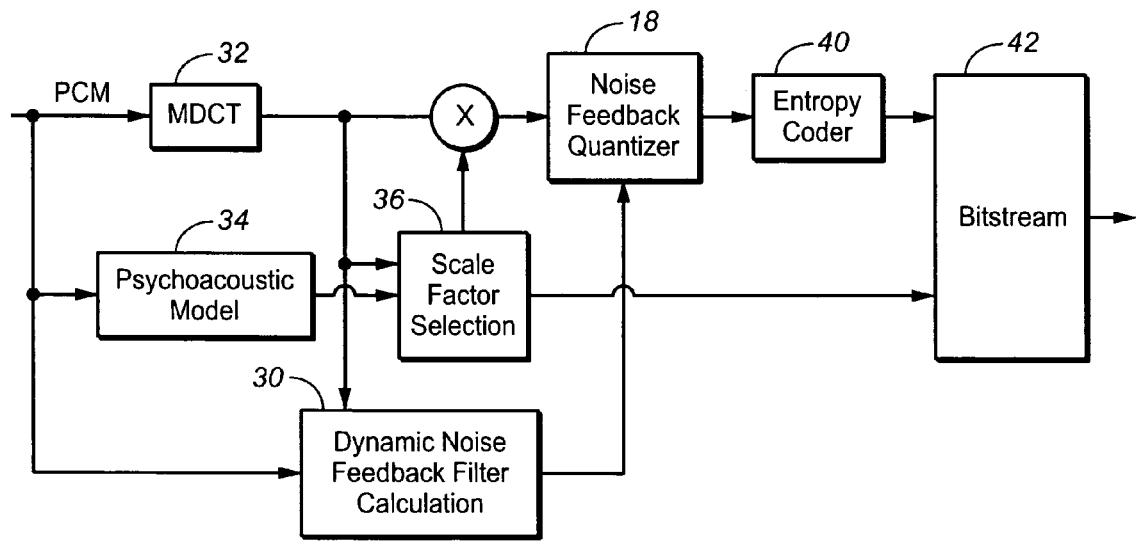
FIG. 7 is a functional schematic block diagram of an example of a simplified AAC audio coding system employing Noise Feedback Quantization in accordance with aspects of the present invention.

If an AAC encoder as in FIG. 6 is modified in the manner as shown in FIG. 7 by adding a Noise Feedback Quantizer 18 and a Dynamic Noise Feedback Calculation 30 and by removing the complementary TNS encoding and decoding filters (namely, filters 6 and 8 of FIG. 1) and the need to transmit TNS filter coefficients from the encoder to the decoder, then, as suggested above, the spectral domain quantization noise may be allocated to fit not only a spectral masking model (by the application of scale factors in the spectral domain) but also a temporal masking model (by the use of NFQ). The Dynamic Noise Feedback Calculation 30 receives its input either from (1) the PCM time-domain input or (2) the frequency-domain output of the MDCT 32. The temporal masking model is not shown in FIG. 7.

According to a first technique, to compute the NFQ filter for use with the MDCT (for example for use in an AAC encoder or encoder/decoder system) the input time domain signal must first be aliased. Given the time sequence for a given transform block:

$$x(n)\ n=0,1,\ldots N-1,$$

one may derive the aliased time sequence:

$$\hat{x}[(n) = x(n) - x\left(\frac{N}{2} - n\right) \quad n = 0, 1, \ldots \frac{N}{2} - 1 \tag{8a}$$

and $$\hat{x}(n) = x(n) + x\left(\frac{N}{2} - n\right) \quad n = \frac{N}{2}, \frac{N}{2} + 1, \ldots N \tag{8b}$$

One may then derive the desired temporal envelope of the quantization noise (E'[n]). Although ideally temporal masking effects should be accounted for in the calculation of the desired envelope, the aliasing property of the MDCT prevents the application of temporal masking to this problem. Hence, one may use the inverse of the temporal energy envelope. That is, one may put more noise into the areas of the signal that are loudest.

$$E(n)=|\hat{x}(n)|^2 \tag{9}$$

and $$E'(n) = \frac{1}{E(n)} \tag{10}$$

The noise feedback filter is then given by equations 6 and 7, above.

Alternatively, the NFQ filter may be generated in the same way that TNS (see reference 1, below) generates its encoding filter and inverting the result. First, the MDCT of the current transform block is calculated:

$$X(k) = MDCT\{x(n)\} n = 0, 1, \ldots, N-1 \ k = 0, 1, \ldots, \frac{N}{2}-1 \quad (11)$$

The autocorrelation of the MDCT spectrum is then calculated:

$$r(m) = \sum_{k=0}^{\frac{N}{2}-1} X(k)X(k-m) \ m = 0, 1, \ldots, \frac{N}{2}-1 \quad (12)$$

One may then compute the linear prediction coefficients as used in TNS (A(z)) using the Levinson Durbin algorithm (see reference 1, below). The noise feedback filter may then be calculated as:

$$F(m) = a_1 F(m-1) + a_2 F(m-2) + \ldots + a_L F(m-L) \text{ for } m=0,1,\ldots M$$

$$F(0)=1$$

$$F(m)=0 \text{ for } m<0 \quad (13)$$

where F is the noise feedback filter transfer function, M is the order of the noise feedback filter, and L is the order of the prediction coefficients.

The NFQ filter generated from equations 11 through 13 provides approximately the same temporal noise shaping as equations 8a through 10. That is, the noise shifts from quiet segments of the audio to louder segments of the audio.

Possible Applications of Noise Feedback Quantization

Applications of Noise Feedback Quantization in accordance with aspects of the present invention may include at least one or more of the following:
  Application to existing audio coding systems: Aspects of the invention may be applied only in the encoder, thus requiring no side-information, allowing application to existing techniques such as MPEG-2/4 AAC and AC-3.
  Application to AAC for lower complexity decoding: because the noise feedback quantization is only performed in the encoder, the AAC decoder can be simplified by replacing TNS with encoder-only noise feedback quantization.
  Application to AAC for scalable to lossless: The new MPEG scalable to lossless audio coder (SLS) uses MPEG-4 AAC as a base layer and transmits the difference between the coded and the original signal such that a lossless representation of the original audio can be reconstructed. This puts constraints on AAC such as an integer MDCT that can be inverted exactly; also tools such as TNS cannot be used, because it has no bit exact inversion in the decoder. However, because the NFQ according to aspects of the present invention is only applied in the encoder it can be used in the SLS profile of MPEG-4.

References and Incorporation by Reference

The following references referred to above are hereby incorporated by reference in their entirety.

[1] J. Herre, J. Johnston, "Enhancing the performance of perceptual audio coders by using temporal noise shaping (TNS)," in Proc. 101st Convention Audio Engineering. Society, 1996, preprint 4384.

[2] Details of MPEG-2/4 AAC may be found in the following references:
  1) ISO/IEC JTC1/SC29, "Information technology—very low bitrate audio-visual coding," ISO/IEC IS-14496 (Part 3, Audio), 1996)
  2) ISO/IEC 13818-7. "MPEG-2 advanced audio coding, AAC". International Standard, 1997;
  3) M. Bosi, K. Brandenburg, S. Quackenbush, L. Fielder, K. Akagiri, H. Fuchs, M. Dietz, J. Herre, G. Davidson, and Y. Oikawa: "ISO/IEC MPEG-2 Advanced Audio Coding". *Proc. of the* 101*st AES-Convention,* 1996;
  4) M. Bosi, K. Brandenburg, S. Quackenbush, L. Fielder, K. Akagiri, H. Fuchs, M. Dietz, J. Herre, G. Davidson, Y. Oikawa: "ISO/IEC MPEG-2 Advanced Audio Coding", *Journal of the AES, Vol.* 45, No. 10, October 1997, pp. 789-814;
  5) Karlheinz Brandenburg: "MP3 and AAC explained". *Proc. of the AES* 17*th International Conference on High Quality Audio Coding,* Florence, Italy, 1999; and
  6) G. A. Soulodre et al.: "Subjective Evaluation of State-of-the-Art Two-Channel Audio Codecs" *J. Audio Eng. Soc., Vol.* 46, No. 3, pp 164-177, March 1998.

[3] J. Princen, A. Bradley, "Analysis/synthesis filter bank design based on time domain aliasing cancellation," IEEE Trans. Accoust. Speech Signal Processing, vol. ASSP-34 pp. 1153-1161, October 1986.

[4] AC-3, also known as Dolby Digital (Dolby and Dolby Digital are trademarks of Dolby Laboratories Licensing Corporation) is defined in the "A/52B document ("Digital Audio Compression Standard (AC-3, E-AC-3) Revision B, and its predecessors, the "A/52A" document ("ATSC Standard: Digital Audio Compression (AC-3), Revision A") and the "A/52" document ("Digital Audio Compression Standard (AC-3)"). See also:
  1) "Design and Implementation of AC-3 Coders," by Steve Vernon, *IEEE Trans. Consumer Electronics, Vol.* 41, No. 3, August 1995.
  2) "The AC-3 Multichannel Coder" by Mark Davis, Audio Engineering Society Preprint 3774, 95th AES Convention, October, 1993.
  3) "High Quality, Low-Rate Audio Transform Coding for Transmission and Multimedia Applications," by Bosi et al, Audio Engineering Society Preprint 3365, 93rd AES Convention, October, 1992.

[5] Werner Verhetst, Dreten De Koning, "Least Squares Theory and Design of Optimal Noise Shaping Filters," AES $22^{nd}$ International Conference on Virtual, Synthetic and Entertainment Audio, June 2002.

Implementation

The invention may be implemented in hardware or software, or a combination of both (e.g., programmable logic arrays). Unless otherwise specified, the algorithms included as part of the invention are not inherently related to any particular computer or other apparatus. In particular, various general-purpose machines may be used with programs written in accordance with the teachings herein, or it may be more convenient to construct more specialized apparatus (e.g., integrated circuits) to perform the required method steps. Thus, the invention may be implemented in one or more computer programs executing on one or more programmable computer systems each comprising at least one processor, at least one data storage system (including volatile and non-volatile memory and/or storage elements), at least one input device or port, and at least one output device or port. Program code is applied to input data to perform the functions described herein and generate output information. The output information is applied to one or more output devices, in known fashion.

Each such program may be implemented in any desired computer language (including machine, assembly, or high level procedural, logical, or object oriented programming languages) to communicate with a computer system. In any case, the language may be a compiled or interpreted language.

Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described herein may be order independent, and thus can be performed in an order different from that described.

The invention claimed is:

1. A digital audio transform encoding method employing transform blocks for encoding a discrete time-domain signal, the method employing quantization of a frequency-domain representation of the discrete time-domain signal, comprising
deriving (20, 22), in the frequency domain, a measure of frequency-domain quantization error (E(k)),
filtering (24), in the frequency domain, the measure of quantization error to produce a filtered measure of quantization error, and
applying (26), in the frequency domain, the filtered measure of quantization error as a feedback signal to the frequency-domain representation of the discrete time-domain signal prior to frequency-domain quantization (20), whereby the filtering parameters of said filtering affect the temporal shaping of quantization noise within a transform block and with unchanged quantization so as to have an arbitrary shape in the time domain resolution when the quantized frequency-domain representation of the discrete time-domain signal is inversely transformed from the frequency domain back to the time domain.

2. A method according to claim 1 in which the filtering parameters are dynamically controllable.

3. A method according to claim 2 in which the filtering parameters are dynamically controllable in response to a measure of the discrete time-domain signal.

4. A method according to claim 3 in which the measure of the discrete time-domain signal is obtained by a process that includes computing the envelope of the temporal signal, inverting it, and computing the inverse DFT of the result.

5. A method according to claim 2 in which the filtering parameters are dynamically controllable in response to a measure of a frequency-domain representation of the discrete time-domain signal (F(m)).

6. A method according to claim 5 in which the measure of the frequency-domain representation of the discrete time-domain signal is obtained by a process (30) that includes a linear-predictive-coding (LPC) calculation.

7. A method according to claim 1 wherein the filtering parameters are also responsive to a temporal masking model.

8. A method according to claim 7 wherein the temporal masking model seeks to provide a selected quantization noise temporal shape.

9. A method according to claim 7 wherein the temporal masking model seeks to shift the temporal quantization noise within a transform block from relatively quiet segments to relatively loud segments of the discrete time-domain signal.

10. A method according to claim 1 wherein said filtering filters the measure of the frequency domain quantization error to produce a filtered measure of quantization error for each of one or more frequency bins or groups of frequency bins so that the filtered measure of quantization error may vary throughout segments of the spectrum of the frequency-domain representation of the discrete time-domain signal.

11. A digital audio encoding method according to claim 1 further comprising
encoding the quantized frequency-domain representation of the discrete time-domain signal to produce an encoded bitstream (40, 42).

12. A method for frequency-domain noise-feedback quantizing in a digital audio transform encoder employing transform blocks, comprising
combining (26) a frequency domain signal derived from a time-domain audio signal with a frequency-domain noise feedback signal to generate a frequency-domain quantizer input signal,
quantizing (20) the frequency domain quantizer input signal to generate a frequency-domain quantizer output signal,
combining (22) the frequency-domain quantizer input signal and the frequency-domain quantizer output signal to generate a frequency-domain quantization error signal, and
filtering (24) the frequency-domain quantization error signal to generate the frequency-domain noise feedback signal for affecting the temporal shaping of quantization noise within a transform block and with unchanged quantizing resolution as to have an arbitrary shape in the time domain.

13. A method according to claim 12 further comprising dynamically controlling the frequency-domain noise feedback filter parameters.

14. A method according to claim 13 wherein the dynamic controlling controls the frequency domain noise feedback filter parameters in response to a measure of a time-domain audio signal (F(m)) from which said frequency-domain signal is derived.

15. A method according to claim 14 wherein the dynamic controlling controls the frequency-domain noise feedback filter parameters also in response to a temporal masking model.

16. Apparatus comprising means adapted to perform all steps of the method of claim 1 or claim 12.

17. A computer program stored on a computer-readable non-transitory medium, the computer program being adapted to cause a computer to perform all the steps of the method of claim 1 or claim 12.

18. A frequency-domain noise-feedback quantizer for use in a digital audio transform encoder employing transform blocks, comprising
a first combiner (26) that combines a frequency-domain signal derived from a time-domain audio signal with a frequency-domain noise feedback signal to generate a frequency domain quantizer input signal,
a quantizer (20) that quantizes the frequency-domain quantizer input signal to generate a frequency-domain quantizer output signal, a second combiner (22) that combines the frequency-domain quantizer input signal and the frequency-domain quantizer output signal to generate a quantization error signal, and a noise feedback filter (24) that filters the frequency-domain quantization error signal to generate the frequency-domain noise feedback signal for affecting the temporal shape of quantization noise within a transform block and with unchanged quantizer resolution so as to have an arbitrary shape in the time domain.

19. A quantizer according to claim 18 further comprising a frequency-domain filter parameter controller (30) that dynamically controls the noise feedback filter parameters.

20. A frequency-domain quantizer according to claim 19 wherein the filter parameter controller (30) controls the noise feedback filter parameters in response to one or more measures ($E(k)$) of a time-domain audio signal from which said frequency-domain signal is derived.

21. A quantizer according to claim 20 wherein the filter parameter controller (30) controls the noise feedback filter parameters also in response to a temporal masking model.

22. A quantizer according to claim 18 wherein the order of the noise feedback filter is in the range of 10 through 20.

* * * * *